United States Patent Office 2,866,522
Patented Dec. 30, 1958

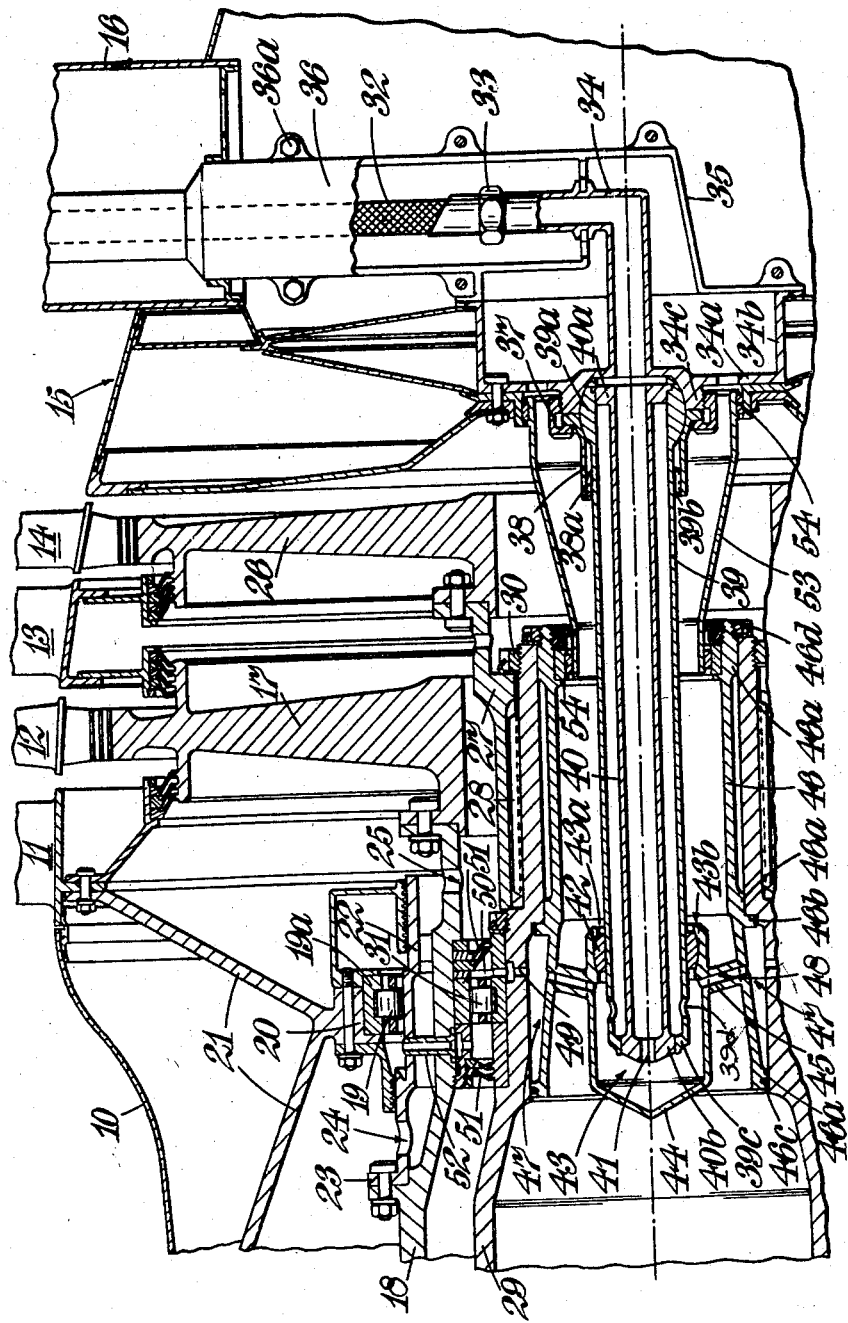

2,866,522

LUBRICATING ARRANGEMENTS FOR BEARINGS OF ROTATABLE SHAFTS

Frederick William Walton Morley, Castle Donington, and Wilfred Henry Wilkinson, Turnditch, England, assignors to Rolls-Royce Limited, Derby, England, a British company Application July 25, 1955, Serial No. 524,031

Claims priority, application Great Britain August 6, 1954

7 Claims. (Cl. 184—6)

This invention relates to lubricating arrangements for bearings of rotatable shafts.

Heretofore it has been usual to deliver lubricant to a shaft bearing from radially outside the shaft and this gives rise to difficulties in operation, particularly if lubricant is to be conveyed to a bearing between two rotating shafts.

According to the present invention, a lubricating arrangement for a bearing of a rotatable shaft comprises a fixed oil supply pipe a major part at least of which is disposed beyond an end of the shaft and having an outlet disposed near the end of and coaxially with the shaft, an oil distributor located within the shaft adjacent the bearing to be lubricated and including a chamber having an inlet coaxial with the shaft and facing that end of the shaft near which the outlet end of the fixed supply pipe is located and having outwardly-directed outlet ducts through the shaft to the bearing thereof, and an oil transfer pipe extending from the outlet of the fixed supply pipe into the inlet of the chamber of the oil distributor and being connected with the outlet of the fixed oil supply pipe and with the oil distributor through connections, one at least of said connections being adapted to permit relative rotation of the parts joined thereby about the axis of the shaft, and both said connections being adapted to permit universal movement of the parts joined thereby.

According to a preferred feature of this invention, the oil transfer pipe is connected with the outlet of the fixed oil supply pipe through a ball-and-socket type joint and is connected with the oil distributor at the inlet to the chamber by a collar having an external spherical surface engaged in a correspondingly-shaped groove around the periphery of the inlet to the chamber and slidable relative to the oil transfer pipe.

According to another preferred feature of this invention, the chamber of the oil distributor is formed in a boss of a spider device having a number of arms leading from the boss to a sleeve portion which fits within the shaft and forms therewith an annular distributor chamber, the oil outlet ducts extending in the arms from the inlet chamber to the oil distributor chamber and from the oil distributor chamber through the shaft to the bearing.

In an arrangement in which lubricating oil is being fed to a bearing separating coaxial nested shafts, the oil distributor is conveniently arranged within the inner shaft adjacent the bearing between the shafts and labyrinth-type seals are provided at each side of the bearing between the shafts to form a chamber housing the bearing from which lubricant may be collected and conveyed by an outwardly-extending duct or ducts through the outer shaft to a bearing by which the outer shaft is mounted in surrounding structural members.

One embodiment of lubricating arrangement according to this invention will now be described as applied to the lubrication of the bearings at the turbine ends of coaxial nested shafts of a compound gas-turbine engine, the description making reference to the accompanying diagrammatic drawing which is an axial section through part of the turbine and the shafts carrying the turbine discs.

Referring to the drawing, the outlet end of the combustion equipment of a gas-turbine engine is indicated at 10 and the hot gases from the combustion equipment flow past nozzle-guide-vanes 11 to the high pressure turbine blades 12 and from the high-pressure turbine blades through interstage guide vanes 13 to low-pressure turbine blades 14. The exhaust gases from the turbines flow through an exhaust assembly including a central bullet structure 15 which is supported from an outer wall (not shown) by means of supporting struts 16.

The high-pressure turbine blades 12 are carried on a turbine disc 17 secured to the end of a high-pressure shaft 18 and the high-pressure shaft 18 adjacent the turbine disc 17 is supported in a bearing 19 located in a housing structure 20 carried by load-bearing structure 21 of the engine.

In the particular arrangement shown, the rollers of the bearing 19 engage a channel-type race 19a, which is secured in the housing structure 20, and the rollers run on a sleeve 22 which is secured to the shaft 18 over a flange 23 at one end of the sleeve and is spaced from the shaft over the greater part of its length so as to provide a cooling air channel within the bearing extending from ports 24, to which cooling air is supplied under pressure, to the downstream end of the sleeve 22. The air may then flow outwardly to cool the front face of disc 17, and thence through a seal into the working fluid passage, or through ports 25 provided in the shaft 18 to flow through a central bore in the disc 17 to the downstream side thereof.

The low-pressure turbine blades 14 are carried on a disc 26 which is bolted to the downstream end of a short sleeve 27 which is engaged by splines 28 on the end of a low-pressure shaft 29 and is locked thereon by a ring nut 30.

The shaft 29 extends coaxially through the shaft 18 in spaced relation thereto and an intershaft or spacer bearing 31 is provided between the two shafts substantially in the same plane as the bearing 19.

The following arrangement is provided for supplying lubricating oil to the bearings 19 and 31. An oil supply pipe 32 extends through one of the struts 16 to a union 33 at one end of an elbow-shaped pipe member 34 which is mounted within the bullet 15.

The limb of the elbow-shaped pipe member 34 carrying the union 33 is radial to the engine axis and the other limb of the elbow-shaped pipe member 34 is disposed coaxially with the shafts 18 and 19 and has its outlet end disposed just on the downstream side of the low-pressure disc 26.

The elbow-shaped pipe member 34 has the end of its axially-extending limb nearer the disc 26 provided with an outward flange 34a which is provided at its periphery with an axially-extending flange 34b to form part of a chamber encircling the axial limb, this chamber being closed by a wall 35 provided at the inner end of a cooling air tube 36 which extends outwardly around the oil supply pipe 32. The tube 36 is conveniently formed in two parts split axially of the engine and secured by bolts 36a.

The elbow-shaped pipe member 34 also has at the outlet end of its axially-directed limb a boss 34c providing part of the socket portion of a ball-and-socket joint and the boss 34c is externally screw-threaded to receive a retaining ring 37 by which a sleeve member 38 is held in abutment with the boss 34c. The abutting end of the sleeve 38 forms the remainder of the socket of the ball-and-socket joint and the sleeve extends a short way from the ball-and-socket joint towards the turbine discs. The end of the sleeve 38 remote from the ball-and-socket joint is formed with internal splines 38a.

The ball 39a of the ball-and-socket joint is provided at the end of a tubular casing 39 which is formed externally with splines 39b to co-operate with the splines 38a and which accommodates an oil transfer pipe 40. The oil transfer pipe 40 and its casing 39 are of approximately the same length and the oil transfer pipe 40 has at its end adjacent the ball 39a a radial flange 40a by which this end of the oil transfer pipe is located with respect to the casing 39. The other end of the oil transfer pipe 40 is formed with a cylindrical land 40b in sliding engagement with a corresponding inward flange 39c on the casing 39. The oil transfer pipe 40 is thus held in spaced relation to its casing 39 over the greater part of its length. The oil transfer pipe 40 has a bore running through it to an outlet hole 41 at its end remote from the ball 39a.

The oil transfer pipe 40 and its casing 39 extend from the ball-and-socket joint through the central bores of the turbine discs 26, 17 and into the low-pressure shaft 29 to a point substantially level with the bearing 31 and at this end the casing 39 has slidably engaged on it a collar 42 whereof the external surface is part-spherical and is received in a part-spherical channel formed in the periphery of an inlet opening 43a to an oil inlet chamber 43 of an oil distributor. The periphery of inlet opening 43a is slotted as indicated at 43b to permit insertion of collar 42, the collar being turned through a right angle on insertion about an axis at right angles to the shaft axis.

The casing 39 is provided with holes 39d to permit any oil leaking into the space between pipe 40 and casing 39 to escape into chamber 43.

The oil distributor comprises a spider member mounted within the shaft 29 and having a hollow boss 44 providing the inlet chamber 43. The boss 44 is connected by arms 45 to a sleeve-like portion 46. The portion 46 is formed with cylindrical lands 46a slidably engaging the internal surface of the shaft 29, has a nut member 46d carried at its end to prevent axial displacement of the spider member in the shaft 29 towards its upstream end, has a flange 46b to prevent displacement in the shaft 29 in opposite sense, and has a seal-carrying groove 46c at its upstream end which co-operates with the internal surface of the shaft. Seal-carrying grooves 46c may also be formed in the other lands 46a. The sleeve-like portion 46 of the spider member is spaced from the shaft 29 between the flange 46b and the seal-carrying groove 46c at its upstream end so as to form an annular oil distributor chamber 47 which is connected by ducts 48 running in the arms 45 with the inlet chamber 43 and is connected by ducts 49 in the shaft 29 to a space 50 accommodating the bearing 31 and bounded by a pair of labyrinth seals 51 provided between the two shafts 18 and 29, one on each side of the bearing 31.

In use, oil will flow under pressure from the pipe 32 into the elbow-shaped pipe 34, through the oil transfer pipe 40, into the inlet chamber 43 of the spider member and thence through the ducts 48 to the oil distributor chamber 47 and through ducts 49 into the chamber 50 so lubricating the bearing 31. It will be clear that this flow will be assisted by centrifugal action.

The oil is scavenged from the space 50 by means of radially-extending tubes 52 mounted in the shaft 18 to extend outwardly to the bearing sleeve 22. Thus, oil is conveyed from the space 50 into the housing 20 to lubricate bearing 19. The oil fed into the housing 20 may be scavenged therefrom in any convenient way.

The chamber formed by the flanges 34a, 34b and part 35 is connected by an air-transfer duct 53 to the downstream end of the sleeve-like portion 46 of the spider member. The air-transfer duct 53 has its ends connected by spherical-surfaced rings 54 to the fixed and rotating structures, and the ring 54 between the transfer duct 53 and the sleeve-like portion 46 of the spider member is both rotatable with respect to and slidable axially on the duct member 53. The other ring 54 is located axially with respect to the duct member 53.

Cooling air is caused to flow to within the shaft 29, and thence it passes through sleeve 46 between the arms 45 of the spider member, through air transfer duct 53, through the chamber formed by flanges 34a, 34b and part 35, and outwardly through tube 36 surrounding the oil supply pipe 32.

It will be seen that with the arrangement described, oil is readily transferred to within the high-speed rotating shafts from fixed structure, the oil distributor 44, 45, 46 rotating relative to the transfer pipe 40 and its casing 39, and it will be seen that the flow of lubricant is assisted by centrifugal action. Also any misalignment between the fixed structure and the rotating shafts is readily accommodated by the universal connections employed between the ends of the oil transfer pipe casing 39 and the parts 34 and 44 respectively.

We claim:

1. A lubricating arrangement for the bearing of a shaft comprising a fixed oil supply pipe a major part at least of which is disposed beyond an end of the shaft and having an outlet disposed near the end of and coaxially with the shaft, an oil distributor located within the shaft adjacent the bearing to be lubricated and including a chamber having an inlet coaxial with the shaft and facing that end of the shaft near which the outlet end of the fixed supply pipe is located and having outwardly-directed outlet ducts through the shaft to the bearing thereof, an oil transfer pipe, a first substantially pressure-tight connection between the outlet of the fixed supply pipe and one end of the oil transfer pipe, a second substantially pressure-tight connection between the other end of the oil transfer pipe and the inlet of the chamber of the oil distributor, one at least of said connections permitting relative rotation of the parts joined thereby about the axis of the shaft, and both said connections including means for permitting limited universal movement of the parts joined thereby.

2. A lubricating arrangement for the bearing of a shaft comprising a fixed oil supply pipe a major part at least of which is disposed beyond an end of the shaft and having an outlet disposed near the end of and coaxially with the shaft, an oil distributor located within the shaft adjacent the bearing to be lubricated and including a chamber having an inlet coaxial with the shaft and facing that end of the shaft near which the outlet end of the fixed supply pipe is located and having outwardly-directed outlet ducts through the shaft to the bearing thereof, and an oil transfer pipe extending from the outlet of the fixed supply pipe into the inlet of the chamber of the oil distributor, said oil transfer pipe being connected with the outlet of the fixed oil supply pipe through a ball-and-socket type joint and being connected with the oil distributor at the inlet to the chamber by a collar having an external spherical surface engaged in a correspondingly-shaped groove around the periphery of the inlet to the chamber and slidable relative to the oil transfer pipe, whereby one at least of said connections permitting relative rotation of the parts joined thereby about the axis of the shaft, and both said connections permitting universal movement of the parts joined thereby.

3. A lubricating arrangement as claimed in claim 2, wherein said oil transfer pipe extends in spaced relation within a tubular casing which is provided at one end with the ball of the ball-and-socket type joint and has the collar slidable on its other end, and the oil transfer pipe is located at one end with respect to said tubular casing and slidably engages the casing by its other end.

4. A lubricating arrangement as claimed in claim 3, wherein said casing is provided adjacent said ball with splines to co-operate with corresponding splines on part of the fixed oil pipe.

5. A lubricating arrangement as claimed in claim 2, wherein said chamber of the oil distributor is formed in a boss of a spider device having a number of arms leading from the boss to a sleeve portion which fits within the shaft and forms therewith an annular distributor chamber, the oil outlet ducts extending in the arms from the first chamber to the annular distributor chamber and from the annular distributor chamber through the shaft to the bearing.

6. In a structure including a pair of coaxial shafts one within the other, a bearing between said shafts and labyrinth seal means between the shafts at each side of the bearing to define a bearing housing chamber, a lubricating arrangement for the bearing between the shafts comprising a fixed oil supply pipe a major part at least of which is disposed beyond an end of the inner of said pair of shafts and having an outlet disposed near the end of and coaxial with said inner shaft, an oil distributor located within the inner shaft adjacent the bearing to be lubricated and including a chamber having an inlet coaxial with the inner shaft and facing that end of the inner shaft near which the outlet end of the fixed supply pipe is located, and having outwardly-directed outlet ducts through the shaft leading to said bearing housing chamber, and an oil transfer pipe extending from the outlet of the fixed supply pipe into the inlet of the chamber of the oil distributor and being connected with the outlet of the fixed oil supply pipe through a ball-and-socket type joint and with the oil distributor at the inlet to the chamber by a collar having an external spherical surface engaged in a correspondingly-shaped groove around the periphery of the inlet to the chamber and slidable relative to the oil transfer pipe.

7. A lubricating arrangement according to claim 6, comprising a further bearing supporting the outer shaft of the nested shafts in surrounding structural members, and means to deliver lubricant from said bearing housing chamber to lubricate said further bearing.

References Cited in the file of this patent
FOREIGN PATENTS
610,010     Great Britain _____ Oct. 11, 1948